June 14, 1960     H. J. SCHULTZ     2,940,476
OPEN CENTER FOUR WAY VALVE
Filed April 21, 1958
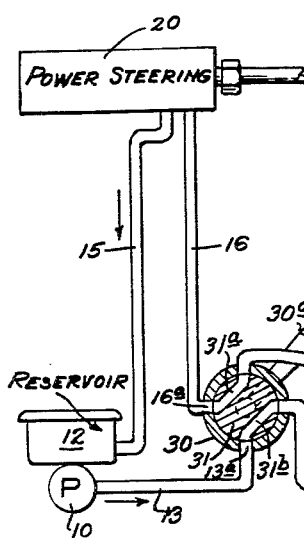
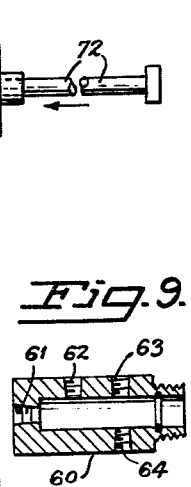
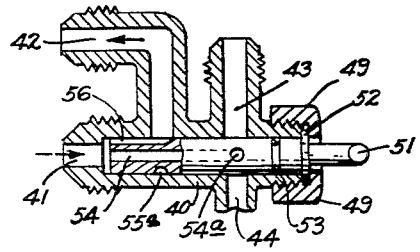
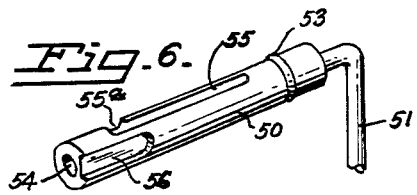
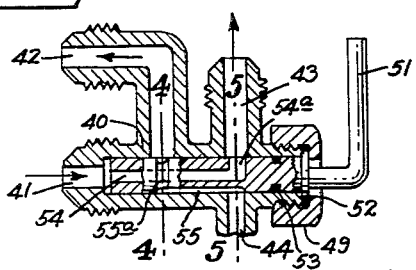
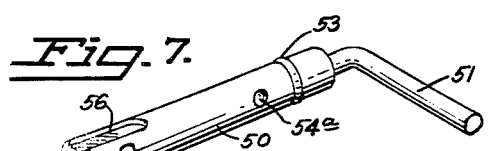
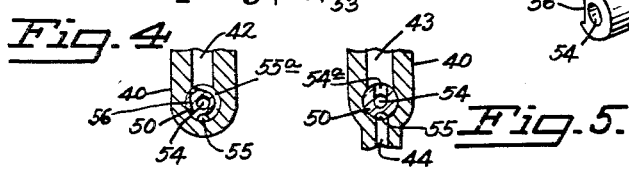
INVENTOR.
HENRY J. SCHULTZ
BY

2,940,476

OPEN CENTER FOUR WAY VALVE

Henry J. Schultz, Hayward, Calif., assignor to Brooks Walker

Filed Apr. 21, 1958, Ser. No. 729,795

6 Claims. (Cl. 137—624)

This invention pertains to improvements in the construction of an open center four-way valve in which great economy of space, weight, size of the overall valve and its component parts are one of the main features.

Another feature of the invention is the very small compact valve cylinder portion which includes passages through the center as well as ports along or around portions of its outer diameter. A single O-ring seal for the valve structure is also a feature of the invention. When the valve is used in connection with a hydraulic jack from the power steering source on a vehicle it can be located right at the jack and either allow free flow of the pump through the valve while holding the jack in a raised position or control the raising or lowering or holding in an intermediate position. The same is true when used as the control for a lifting tail gate, plough, snow plough, bulldozer blade, convertible top, etc., on a vehicle whether passenger, truck, or tractor. Previous open center four-way valves have been much more complicated and less compact and involved many more parts and seals than this present construction.

Further objects of the invention will be more particularly pointed out in the accompanying specifications and claims.

I have illustrated my invention by way of example in the accompanying figures, in which:

Fig. 1 is a sectional side elevation view with an associated hydraulic circuit shown in schematic form which illustrates one form of the invention.

Fig. 2 is a sectional side elevation of a portion of a valve shown in Fig. 1 but with the valve control in a different position.

Fig. 3 is similar to Fig. 2 but with the valve control in a third position.

Fig. 4 shows a portion of the valve taken at section 4—4 of Fig. 3.

Fig. 5 shows a portion of the valve taken at 5—5 of Fig. 3.

Fig. 6 is an enlarged perspective view of the valve cylinder and control handle shown down.

Fig. 7 is similar to Fig. 6 but with the control handle shown horizontal.

Fig. 8 is similar to Figs. 6 and 7 but with the control handle shown vertical.

Fig. 9 is a reduced section of an alternate body construction incorporating another form of the invention.

Like numerals of reference refer to corresponding parts in the various views.

In Figs. 1 through 8 inclusive I have shown a pump 10 such as the power steering pump on a motor vehicle, a reservoir 12, line 13, going from the pump to selector valve 30, selector valve 30 having control handle 30a, rotating portion 31 with ports 31a and 31b. Power steering unit 20 is supplied by oil flowing from pump 10 through line 13, port 13a when handle 30a is swung to connect valve port 13a to valve port 16a by passage 31b and by line 16 to power steering unit 20 and back to reservoir 12 through line 15. This is the normal operation with handle 30a swung clockwise as described so that passage 31a connects port 16a with port 13a.

In this same position of valve 30, line 17 will be connected to line 14 by passage 31a so that no liquid will flow through the long lines to valve 40. Valve 40 which forms the main portion of this invention has four openings connecting to the central portion where the rotating valve is located. One is opening 41 which is connected to the pump 10 when valve 31 is in the position shown in Fig. 1 where liquid from the pump flows through line 13, port 13a, passage 31b, line 14, opening 41. If control valve 30 is not necessary in the particular installation, the pump 10 can be connected directly to opening 41 by a line such as 13 passing directly to opening 41. Within the body of the valve 40 is a cylindrical portion 50 with an O-ring seal 53, a washer 52 of larger diameter than the diameter of valve 50, and a control handle 51 forming a right angle with the axis of rotation of valve 50. Valve retaining nut 49 screws onto valve body 40 and retains washer 52, both of which will pass over control arm 51. Opening 49a in nut 49 is large enough to pass around the turn in control arm 51 and therefore washer 52 is necessary to provide the smaller opening in order to retain valve body 50. Valve cylinder 50 has a central hole 54 passing through to where it intercepts radial hole 54a. Ports 43 and 44 are radially aligned and also aligned with opening 54a. Groove 55 extends along the outer diameter of valve 50 parallel with the axis of rotation and then curves around the diameter as shown in 55a. One end of groove 55 lines up with port 43. The other end 55a lines up with port 42. A third passage is provided in groove 56 which extends from the left end of valve cylinder 50 as viewed in all figures to a point under opening 42 when cylinder 50 is in the free flow position shown in Fig. 2 and Fig. 7.

In Fig. 9 I have shown an alternate construction of the body in which body portion 60 has openings 61, 62, 63, and 64, all being located similarly to openings or ports 41, 42, 43, and 44 respectively. However, this body is in rectangular block form and has internal threads suitable for attaching fittings to the hoses or pipes and may be more easily produced than the construction shown in Figs. 1–5 inclusive. It will operate in an identically similar manner with a valve cylinder and control such as is shown in Figs. 6, 7, and 8.

In operation with the valve in the position shown in Fig. 1, oil flows from the pump through line 13, port 13a, passage 31b, line 14, port 41, hole 54, in valve cylinder 50, hole 54a, port 44, line 18, to the right end of cylinder 70 to force piston 71 and associated piston rod 72 to the left as indicated by the arrow. The displacement of piston 71 when moving to the left forces liquid through line 19, port 43, passage 55, port 42, line 17, passage 31a, port 16a, line 16, through power seteering unit 20, and back to reservoir 12 through line 15. When piston rod 72 has reached any desired position, valve control arm 51 is moved to the position shown in Fig. 2 and Fig. 7, then the oil or liquid entering port 41 passes through slot 56 to port 42 and thence through line 17, passage 31a, port 16a, line 16, directly to power steering and then back to the reservoir through line 15 with ports 43 and 44 closed off by the outer diameter of valve cylinder 50 to hold piston 71 in a pre-set position. When it is desired to move the piston rod 72 back to the right as viewed in Fig. 1, valve control arm 51 is moved to the raised position as shown in Figs. 3 and 8 wherein oil from the pump enters port 41, passes through opening 54 in the center of valve cylinder 50, out through opening 54a, into port 43, line 19, to the left end of cylinder 70. The discharge from the right end of cylinder 70 goes through line 18 to port 44 along passage 55 and around passage 55a to port 42 to line 17, passage 31a, port 16a, line 16, through power steering and back to the reservoir 12 through line 15. From this description it can be seen that with a simple control valve 40 and a very simple cylindrical valve section 50 which can be easily produced, I have provided a compact, inexpensive, lightweight valve with few seals that is particularly suited for some of the applications recited. Nuts 48 secure the tubing or hoses to the various ports of valve 40 and may be either of the type shown in 48 or 48a. If of the type 48a, the housing for port 44 will probably have to be welded or brazed onto the valve body 40 or the ends swedged out after the nut 48 has been put on.

With lines 17 and 14 reversed as described above, the operation of cylinder 1 will be controlled by valve handle 51 but the direction of travel of piston rod 72 will be reversed from those described, with lines 17 and 14 connected as shown. The bridge between groove 55a and groove 56 is narrower than port 42 so as not to shut off flow through the valve in any control position. In a like manner the bridge between groove 55 and groove 56, as shown in Fig. 4, is preferably less than the diameter of port 42. If a reduced thrust is desired on washer 52, it may be desirable to connect the pump pressure line 14 to port 41 and low pressure return line to port 41. This will result in low fluid pressure acting on the left end of valve 50, as viewed in all figures. If a further reduction in friction of rotation against thrust washer 52 is desired, a thrust bearing can be inserted such as a ball thrust. The use of washer 52 allows the use of a standard nut-like 48 with the taper seat slightly modified, or washer 52 could have a tapered edge to fit a standard nut seat.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A four way hydraulic valve, including a body and a rotatable cylinder in said body with a control shaft extending out from one end of said body and controlling the rotation of said cylinder, said body having an axial port at the other end of said body, first and second diametrically opposite radial ports adjacent said control shaft end and a third radial port spaced between said axial port and said first and second ports and coplanar with said first port, said cylinder having an axial passage leading from said other end to a radial passage axially in line with said first and second ports and therefore adapted for alignment with either of them by turning said cylinder, said cylinder having a first groove in its outer surface leading axially from axial alignment with said first and second radial ports to axial alignment with said third radial port, a second groove connected to said first groove and in axial alignment with said third radial port and extending arcuately at least 180°, and a third groove extending axially from the same end as said axial passage to axial alignment with said third radial port.

2. The valve of claim 1 wherein said third groove is separated from said second groove by walls narrower than the said third radial port.

3. The valve of claim 1 wherein said valve cylinder has a groove with a single O-ring seal therein between said first and second ports and said control shaft.

4. The valve of claim 1 wherein said valve cylinder has a loose locknut thereon abutting said cylinder where it is stepped down to provide said control shaft and said body has a shoulder against which locknut abuts and a cap that secures said locknut in place.

5. A four way hydraulic valve, including a body and a rotatable cylinder in said body with a control shaft extending out from one end of said body and controlling the rotation of said cylinder, said body having an axial port at the other end of said body, first and second axially aligned radial ports adjacent said control shaft end and a third radial port spaced between said axial port and said first and second ports, said cylinder having first passage means leading from said other end to a point axially in line with said first and second ports and therefore adapted for alignment with either of them by turning said cylinder, said cylinder having second passage leading from the axial position of said first and second radial ports to the axial position of said third radial port, and third passage means extending axially from said axial port to axial alignment with said third radial port.

6. A hydraulic system including in combination: a four way hydraulic valve, including a body and a rotatable cylinder in said body with a control shaft extending out from one end of said body and controlling the rotation of said cylinder, said body having an axial port at the other end of said body, first and second diametrically opposite radial ports adjacent said control shaft end and a third radial port spaced between said axial port and said first and second ports, said cylinder having an axial passage leading from said other end to a radial passage axially in line with said first and second ports and therefore adapted for alignment with either of them by turning said cylinder, said cylinder having a first groove in its outer surface leading axially from axial alignment with said first and second radial ports to axial alignment with said third radial port, a second groove connected to said first groove and in axial alignment with said third radial port and extending arcuately at least 180°, and a third groove extending axially from the same end as said axial passage to axial alignment with said third radial port; fluid supply means and fluid return means, one connected to said axial port and the other connected to said third radial port; and a two-way fluid-operated cylinder having two ports, one connected to said first radial port and the other to said second radial port.

References Cited in the file of this patent

UNITED STATES PATENTS

| | | |
|---|---|---|
| 873,476 | Woods | Dec. 10, 1907 |
| 2,256,144 | Gifford et al. | Sept. 16, 1941 |
| 2,312,941 | Tucker | Mar. 2, 1943 |
| 2,391,492 | Turchan et al. | Dec. 25, 1945 |
| 2,661,724 | Blenke | Dec. 8, 1953 |